US009362971B2

(12) United States Patent
Radmard

(10) Patent No.: US 9,362,971 B2
(45) Date of Patent: Jun. 7, 2016

(54) METHOD AND APPARATUS FOR PROTECTION, MOUNTING, AND ACCESSORIZING OF DIGITAL DEVICES

(71) Applicant: Ramak Radmard, Lachine (CA)

(72) Inventor: Ramak Radmard, Lachine (CA)

( * ) Notice: Subject to any disclaimer, the term of this patent is extended or adjusted under 35 U.S.C. 154(b) by 8 days.

(21) Appl. No.: 14/485,752

(22) Filed: Sep. 14, 2014

(65) Prior Publication Data

US 2016/0080022 A1   Mar. 17, 2016

(51) Int. Cl.
   *H04M 1/00*       (2006.01)
   *H04B 1/3888*     (2015.01)
   *H04M 1/11*       (2006.01)

(52) U.S. Cl.
   CPC .............. *H04B 1/3888* (2013.01); *H04M 1/11* (2013.01)

(58) Field of Classification Search
   CPC ........ H04B 1/3888; H04M 1/11; F16M 11/04
   USPC ...................................................... 455/575.8
   See application file for complete search history.

(56) References Cited

U.S. PATENT DOCUMENTS

| 7,918,426 | B2* | 4/2011 | Short | F16M 11/02 |
| | | | | 248/225.11 |
| 2006/0166722 | A1* | 7/2006 | Gu | H04B 1/385 |
| | | | | 455/575.8 |
| 2006/0261227 | A1* | 11/2006 | Petrick | F16M 11/02 |
| | | | | 248/276.1 |
| 2008/0192418 | A1* | 8/2008 | Zambelli | F16M 11/04 |
| | | | | 361/679.02 |
| 2012/0175394 | A1* | 7/2012 | Keune | F16M 13/04 |
| | | | | 224/483 |
| 2012/0318937 | A1* | 12/2012 | Carnevali | F16M 11/041 |
| | | | | 248/122.1 |
| 2013/0301216 | A1* | 11/2013 | Trinh | A47F 7/0246 |
| | | | | 361/679.58 |
| 2014/0268519 | A1* | 9/2014 | Huang | H04B 1/3888 |
| | | | | 361/679.01 |
| 2014/0360893 | A1* | 12/2014 | Whitten | A45D 11/00 |
| | | | | 206/45.2 |
| 2015/0311938 | A1* | 10/2015 | Molnar | H04B 1/3888 |
| | | | | 455/575.8 |

* cited by examiner

*Primary Examiner* — Simon Nguyen
(74) *Attorney, Agent, or Firm* — Kevin Keener; Keener and Associates P.C.

(57) ABSTRACT

The invention comprises a method and apparatus for providing a connection method to digital devices connecting and disconnecting an exo-skeleton, impact protection, wearable computing and ergonomic texturing for digital devices. The invention increases the devices functionality, while providing a secondary quick release mounting method that allow the fast attachment and release of various accessories to the digital device or other objects, as well as providing mounting surfaces that allows for connection of various accessories. The secondary quick release mounting method can be integrated into any object independently, allowing a magnitude of possibilities. The device is made in variety of materials and methods, with an integrated spring mechanism, which allow for preloading and locking of the chucked arms against the digital device for a firm, secure protection of the device's fragile structure against impact as well as providing a connection standard.

20 Claims, 12 Drawing Sheets

METHOD AND APPARATUS FOR PROTECTION, MOUNTING, AND ACCESSORIZING OF DIGITAL DEVICES

CROSS-REFERENCE TO RELATED APPLICATIONS

This application claims priority benefit of U.S. Provisional Patent Application No. 61/878,006, filed Sep. 15, 2013, Method and Apparatus for protection, mounting, and accessorizing of digital devices: An impact absorption system and quick connect system for Mobile Devices, the entire disclosure of which is hereby expressly incorporated by reference herein.

BACKGROUND

Applicant's apparatus relates to apparatus and devices for protecting portable electronic devices and other devices or objects, and more particularly to an apparatus that can quickly and securely connect to other accessories, such as mount, a clip armband or wallet.

Digital devices, mobile computing and communication technology have advanced to allow digital devices to incorporate small hardware components, thereby also decreasing the size of the digital device itself. Mobile device technology has also advanced to allow portability. For example, workstations, laptops, smartphones, tablets, digital players, game systems, cameras, digitally enabled eyewear and music players are all devices that we carry with us into different environments. These devices may become wearable computing enabled or connected to other products or mounts to enhance and improve their functionality and add new functionality from the devices or products to which they connect. These connecting mechanisms may also be used to attach the conventional device to a variety of other products, vehicles, and environments.

With their miniaturization, digital devices have become ever more fragile and more difficult to handle, hence there is an ever emerging market to equip devices with protection mounts and cases. Conventional protection systems may use interference and snapping techniques to secure the protection around the digital device. These methods results in bulky solutions that dramatically increase the size of the digital device and in many cases detract from the device's esthetic design.

Therefore, what is needed in the industry is a new system and apparatus to protect and secure digital devices which is not bulky and which can be easily fitted to a variety of devices.

There are many device cases on the market that are able to hold electronic mobile devices. One such case is known as the lifeproof iPhone case that can protect iPhone device from falls or drops as well as connecting various accessories, the device is snapped onto to the accessory. Another is the Quad Lock mounting system that can also protect the device as well as connecting to various accessories, the device is contented by screwing or twisting it into the accessory. Still other protection system include the type that an inner cushion with a harder exterior shell which can provide a tremendous amount of protection and water proofing, such as the Taktik Extreme. However, these cases are not thin enough for everyday use, or to fit inside a shirt pocket for a truly portable apparatus that can also connect at any possible orientation angle in both the landscape and portrait to other accessories such as a mount or a clip. While providing a unique ergonomic texture to improve the device dexterity.

BRIEF SUMMARY

The present invention comprises new apparatuses and methods of securing a digital device (sometimes referred to as a "system") to a plurality of surfaces or objects. In preferred embodiments, the invention comprises a system having a connectable section designed to attach to digital devices and a section configured to couple to various accessories and/or other digital devices or surfaces. The coupling adds new functionality to the digital device, extending functionality and physically protecting the digital device. The functionalities of the connected accessories correspond to the users preferences and activities.

An apparatus having a plurality of chucked arms, which are configured to expand and retract to connect to the digital device.

Some embodiments use a single axis, yet other embodiments use multiple axes (i.e. more than one axis) to engage and disengage the chucked arms.

Some embodiments use single or multiple axes in combination with other linear or arc motions.

The apparatus may also be configured to act as a protective exo-skeleton shell, encasing the digital device in a hardened armor.

The apparatus may also be configured to act as a security thread, physically attaching the digital device to other objects, vehicles, surfaces, environments or digitally defined geo-tags or areas where an area can be defined using GPS coordinates.

In some embodiments, the apparatus comprises a coupler attached to a connecting system that couples the digital device to various additional accessories, mounts and other devices.

Added modules having coupler lugs can be configured to interact with the digital device such as wallets, pads, clothing, arm bands, wrist bands, chest bands, bags, vehicle mounts, desk mounts, wall mounts, floor mounts, other electrics, electro-biological, electrochemical, electro-neural or electromechanical devices, etc. and the like.

Some embodiments use one or more than one, or even a plurality of coupler lugs or couplers receiving systems integrated into the digital device itself.

Some embodiments use one or many coupler lugs or couplers receiving systems integrated into other objects, vehicles, clothing, environments, surfaces, etc. and the like.

BRIEF DESCRIPTION OF THE DRAWINGS

Applicant's apparatus and devices will be described by way of example with reference to the accompanying drawings, in which.

DETAILED DESCRIPTION

Several embodiments of Applicant's apparatus are shown in FIGS. 1-12, including embodiments of the apparatus in various forms and supporting a device in various positions. Persons skilled in the art will recognize that Applicant's apparatus may also take other forms. Such persons will also recognize that the various types of the apparatus may have various sizes and shapes. In addition, such persons will recognize that the apparatus illustrated in FIGS. 1-12 may take forms other than that shown in FIGS. 1-12, as discussed herein.

As used herein the terms "mobile device", "mobile communication device", and "digital device" shall generally mean a type of computer generally operated by a person. Non-limiting examples of these devices include; tablet PCs including the iPad, cell phones including iOS phones made by Apple Inc., Android OS phones, Microsoft OS phones, Blackberry phones, mobile gaming or music playing devices, wearable computers, or generally any mobile electronic device capable of running computer software or displaying information to a user.

Figure 10:
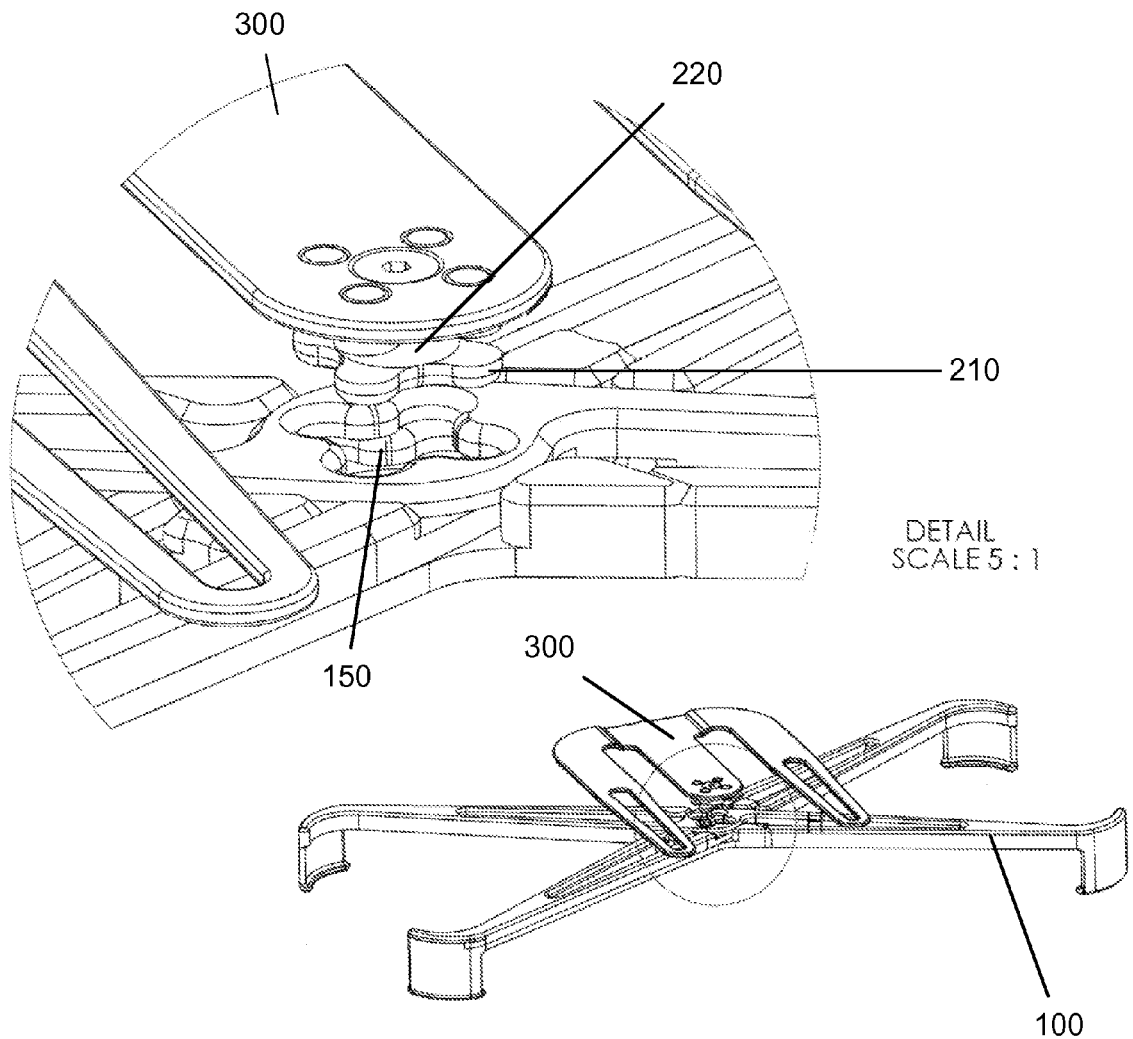
FIG. 10 illustrates one example of the apparatus in an assembled position, receiving the lug and clip accessory.
Figure 11:
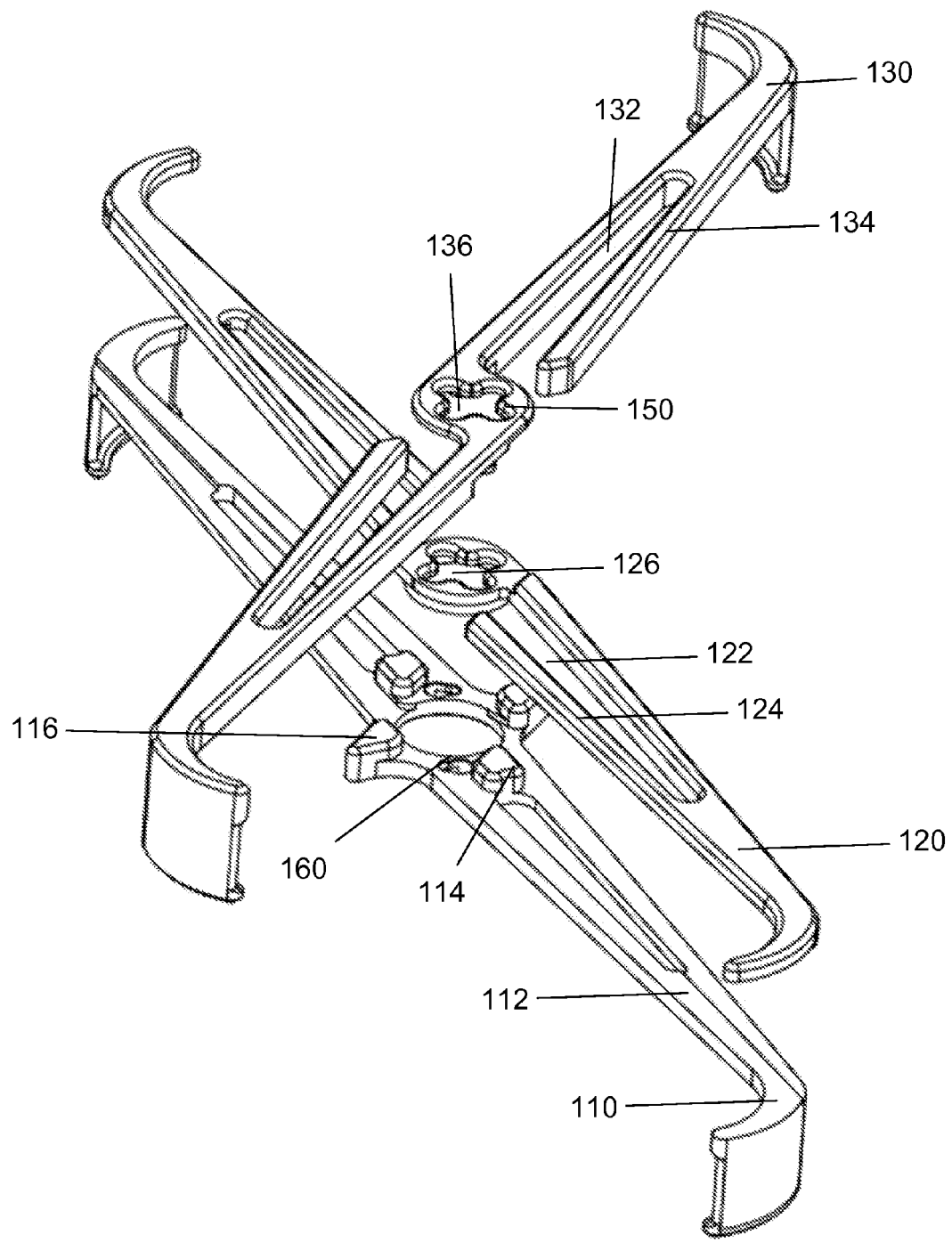
FIG. 11 illustrates an exploded view showing one example of the apparatus in an disassembled position.
Figure 12:
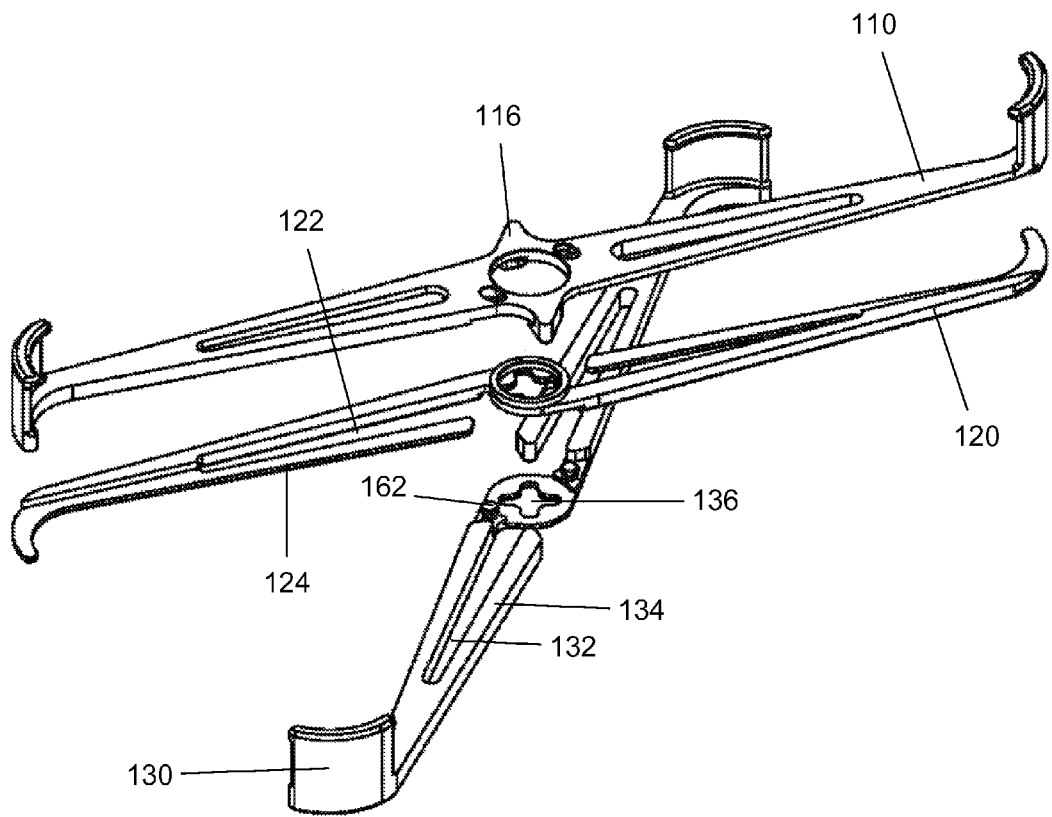
FIG. 12 illustrates an exploded view showing one example of the apparatus in an disassembled position.

In the embodiments represented in FIGS. 10-12, part 1 X-apparatus (sometimes called the "apparatus") is assembled from part Main Spring, Base and Trigger, these 3 parts connect together to form the main assembly.

In some embodiments subsequent to the alignment of Main Spring axis neck, Trigger Spring axis neck and Base axis neck, the parts can be assembled. Some embodiments will require Trigger Spring's Trigger Spring—spring to be loaded to allow retaining key to enter the keyhole to be assembled.

By further extending or opening part Main Spring relative to Base enough space opens for the digital device to enter the chucked arm step and creating an interference enclosure for the device.

The spring forces created by loading Main Spring against Base block puts the apparatus in a condition that it is using mechanical spring loaded forces to close the gap between Main Spring and Base Trigger Spring. When the apparatus is loaded around a digital device, the apparatus springs and clamps to the digital device, firmly holding the device.

The exterior surface of Chucked arm creates the main impact protection for the corners of the digital device. The interior surface of chucked arm provides a surface which any rectangular digital device can be held from, by configuring the variables in step corner, step, inside corner and inside step.

Different size digital devices can be fitted by varying overall lengths of Main Spring and Base and Trigger Spring, creating different sizes of the apparatuses.

Some embodiments utilize multiple axis motion that allow the motion of variety of chucked arm quantities.

The interior finish of the chucked arm can affect the antenna functionality of some devices. For example, this material or finish may be coated with a nonconductive material.

In some embodiments the apparatus comprises powered components to enhance or block radio functions.

Some embodiments require Main Spring spring to be loaded in order to allow for assembly.

The integrated accessory lock mechanism (also known as couplers receiving system) is created by Trigger Spring, this part has its own spring that keeps the interference between Lug lock and Trigger Spring lock.

By sliding Trigger Spring release outwardly the accessory key designs from Lug lock and part coupler Lug and in this embodiment clip apparatus is released from X-Apparatus.

Some embodiments have Lug lock and coupler Lug or Main Spring lock and Trigger Spring lock integrated into the digital device or other objects, surface, or vehicles or environments.

The coupler Lug of Clip apparatus connects through an engagement of Lug lock against Trigger Spring lock of Trigger Spring in assembly X-apparatus.

In some embodiments, the components of the apparatus may be made from plastic, rubber, metal, wood, or any suitable material which may be common in the art of cases and mounts for portable electronic devices.

Figure 1:
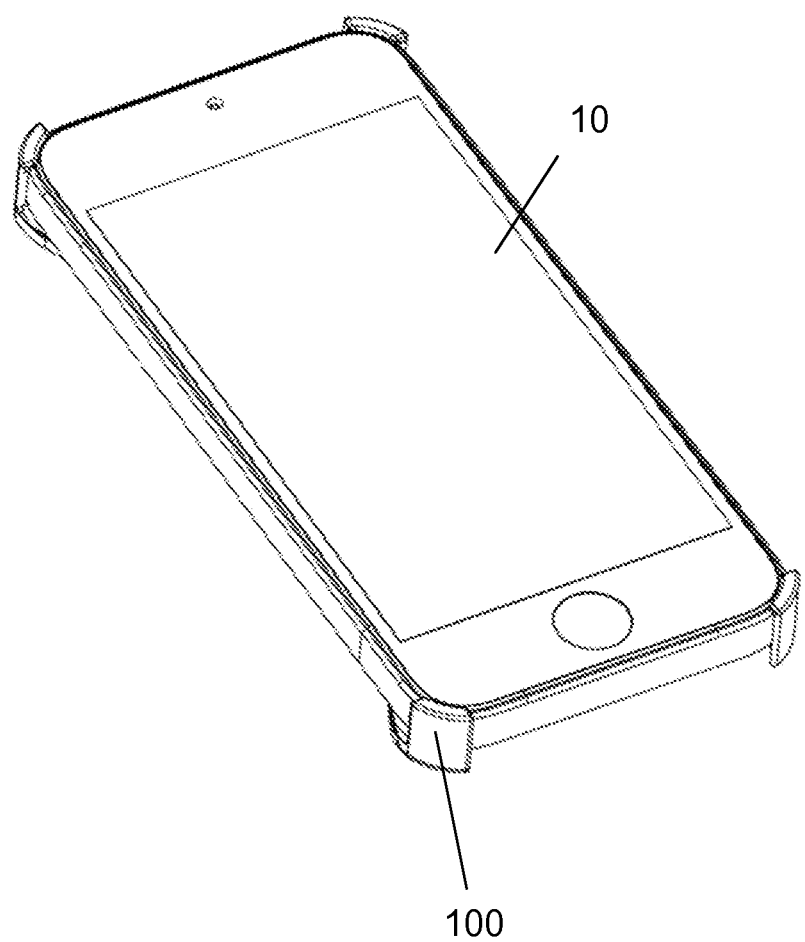
FIG. 1 provides a perspective view showing one example of an apparatus, installed on a mobile communication device.
Figure 2:
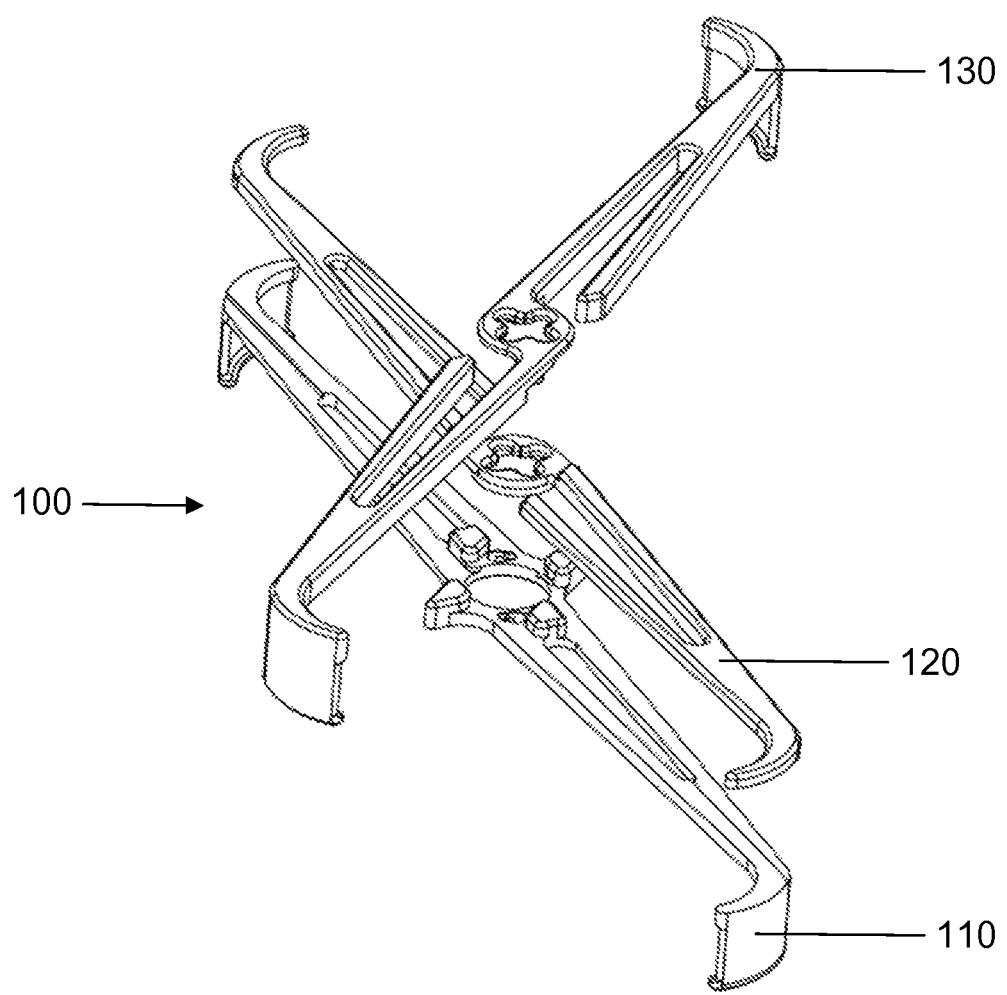
FIG. 2 demonstrates an exploded view showing one example of the apparatus.
Figure 3:
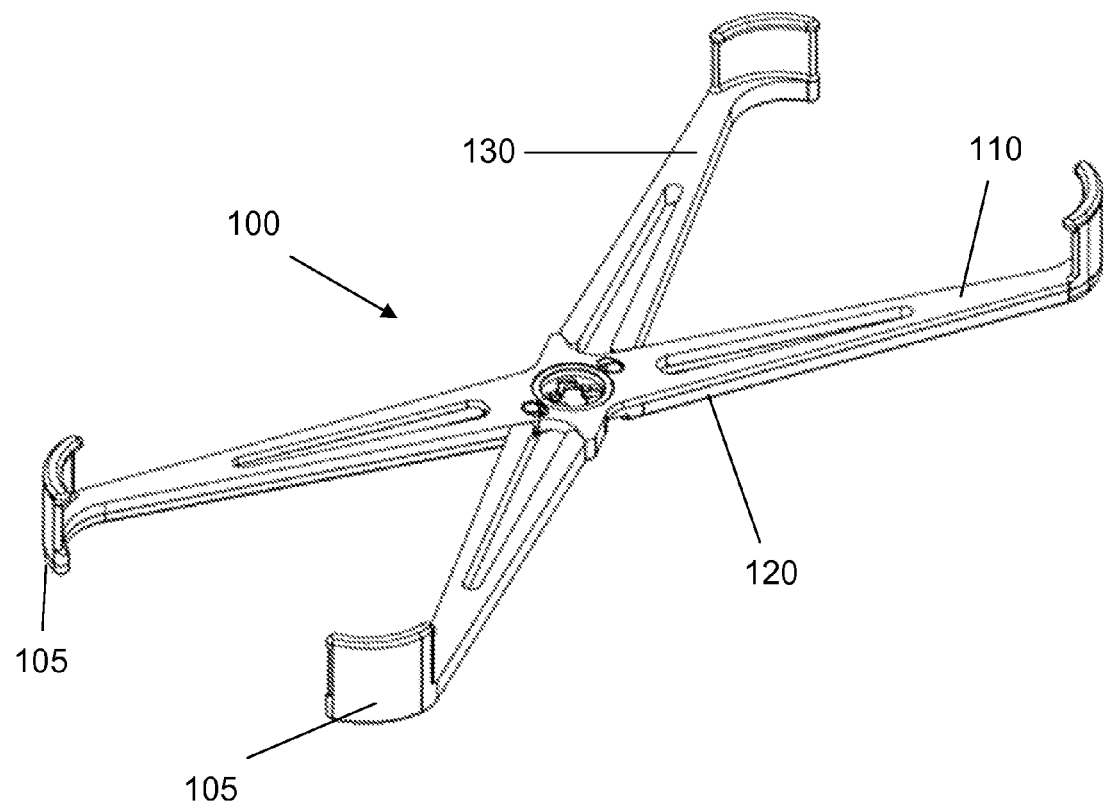
FIG. 3 is an illustration of the inside view showing one example of the assembled apparatus.
Figure 4:
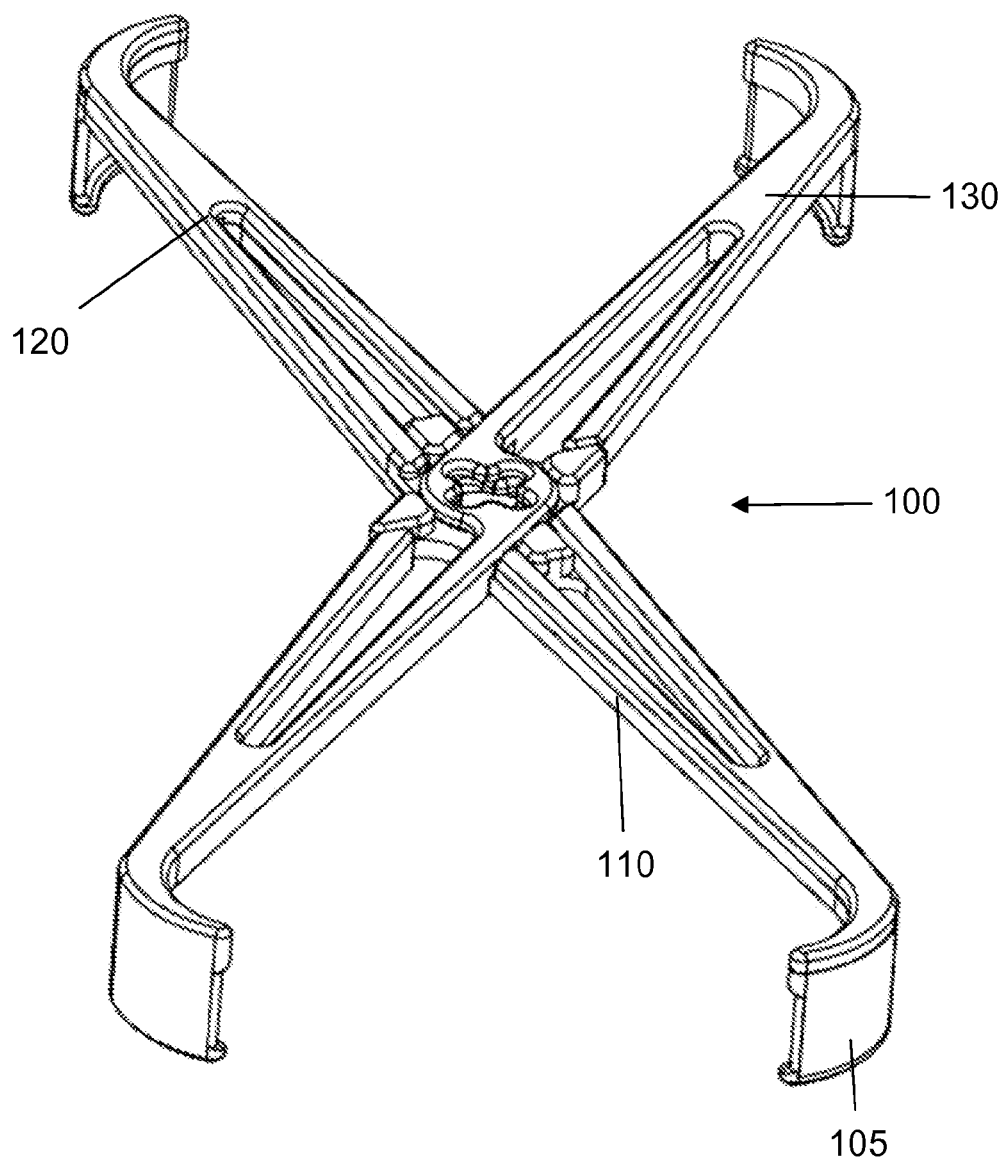
FIG. 4 is the back view showing one example of the assembled apparatus.

Referring to FIG. 1, the casing 100 is configured to be fit on the back of a phone 10 or other electronic device. As illustrated in FIG. 2 through FIG. 4, the casing 100 is comprised of three separate parts attached together. The casing 100 comprises a base arm 110, a trigger arm 120, and a main arm 130. The trigger arm 120 is disposed between the base arm 110 and the main arm 130. Each arm is a longitudinal, symmetrical arm with a first end disposed opposite a second end. Disposed at each end of the base arm 110 is a corner 105 which extends upward from the base arm 110. Disposed at each end of the main arm 130 is a corner 105 which extends upward from the base arm 110. The four corners 105 extend over the corners of the phone 10 to hold and protect the phone 10.

Figure 5:
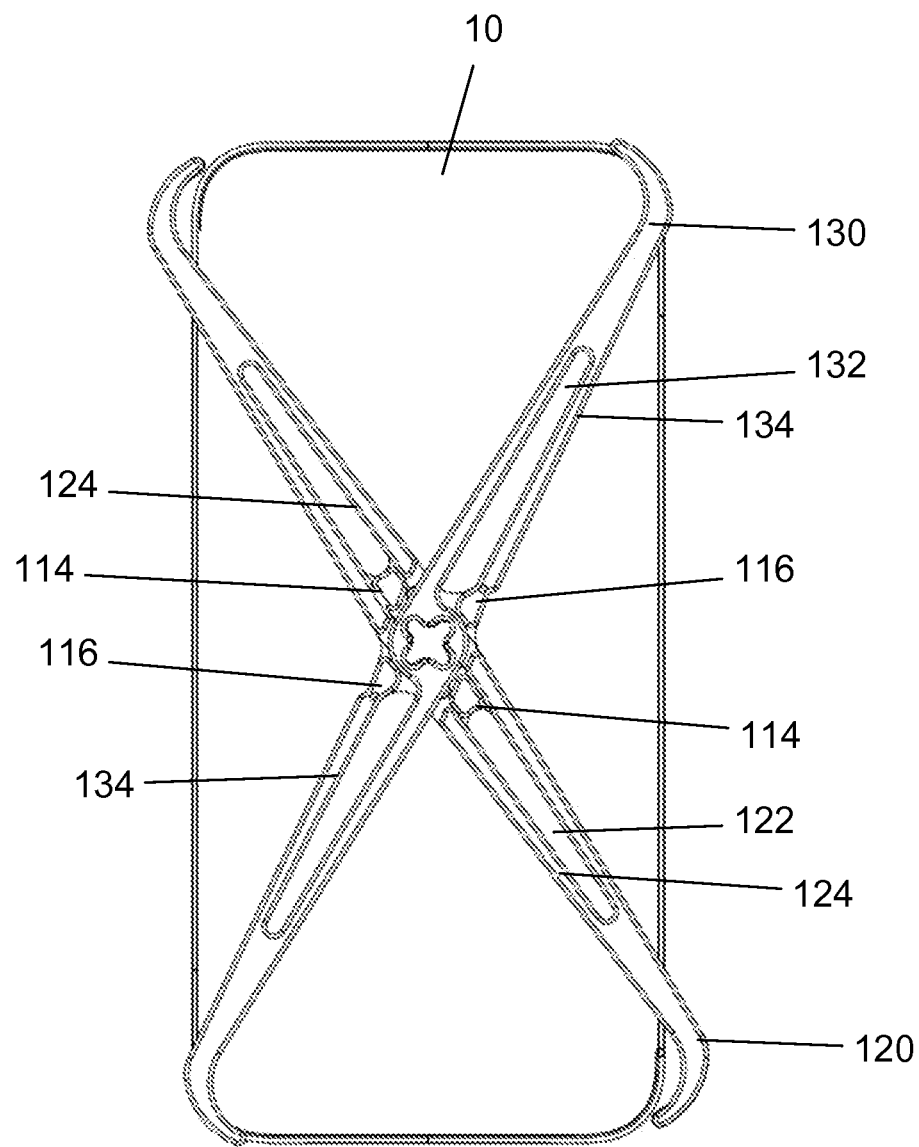
FIG. 5 illustrates one example of the apparatus in the open position receiving a mobile device.
Figure 6:
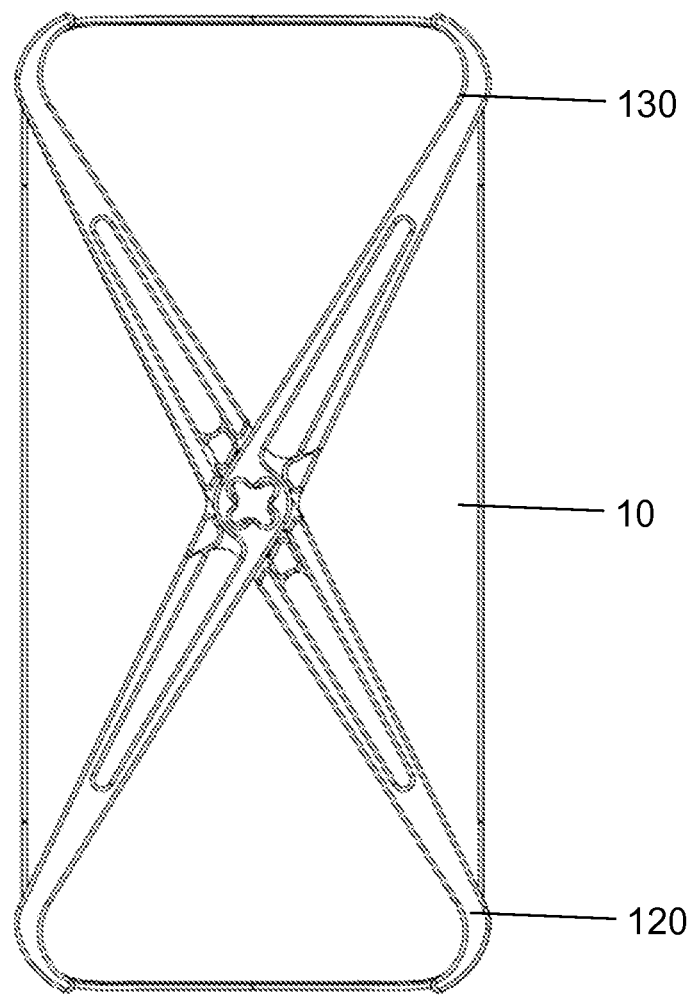
FIG. 6 Illustrates one example of the apparatus in the closed, lock position.
Figure 7:
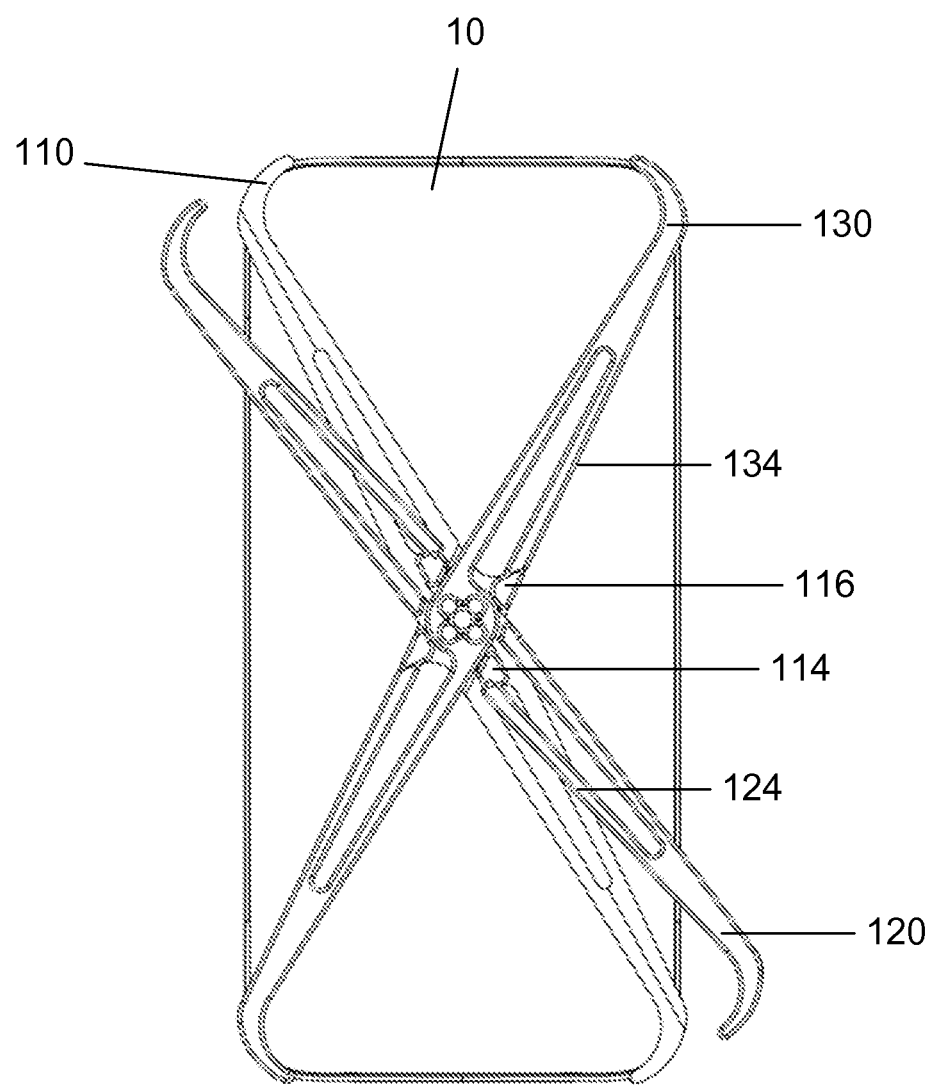
FIG. 7 illustrates one example of the apparatus in the closed lock position with the secondary accessory lug leaver release arm in release position.

Referring to FIG. 5 through FIG. 7, the operation of the casing 100 on the phone 10 is illustrated. The base arm 110 is disposed closest to the phone 10. The base arm 110 has a pair of trigger stops 114 and a pair of main stops 116 disposed at the center of the base arm 110. The trigger arm 120 has a pair of trigger arm springs 124 disposed next to a pair of trigger arm gaps 122 which permit the trigger arm springs 124 to freely flex as the trigger arm 120 rotates about its center point. The main arm 130 has a pair of main arm springs 134 disposed next to a pair of main arm gaps 132 which permit the main arm springs 134 to freely flex as the main arm 130 rotates about its center point.

The pair of trigger stops 114 extend from the main arm 130 into the trigger arm gaps 122. As the trigger arm 120 rotates axially apart from the base arm 110, the trigger arm springs 124 engage the trigger stops 114 and flex, causing the trigger arm gaps 122 to get wider. The flexing causes the trigger arm 120 to return to its original position against the base arm 110.

The pair of main stops 116 extend from the main arm 130 and are disposed against the outer edge of the main arm springs 134. As the main arm 130 rotates axially in relation to the base arm 110, the main arm springs 134 engage the main stops 116 and flex inward, causing the main arm gaps 132 to get smaller. The flexing causes the main arm 130 to return to its original position relative to the base arm 130.

Figure 8:
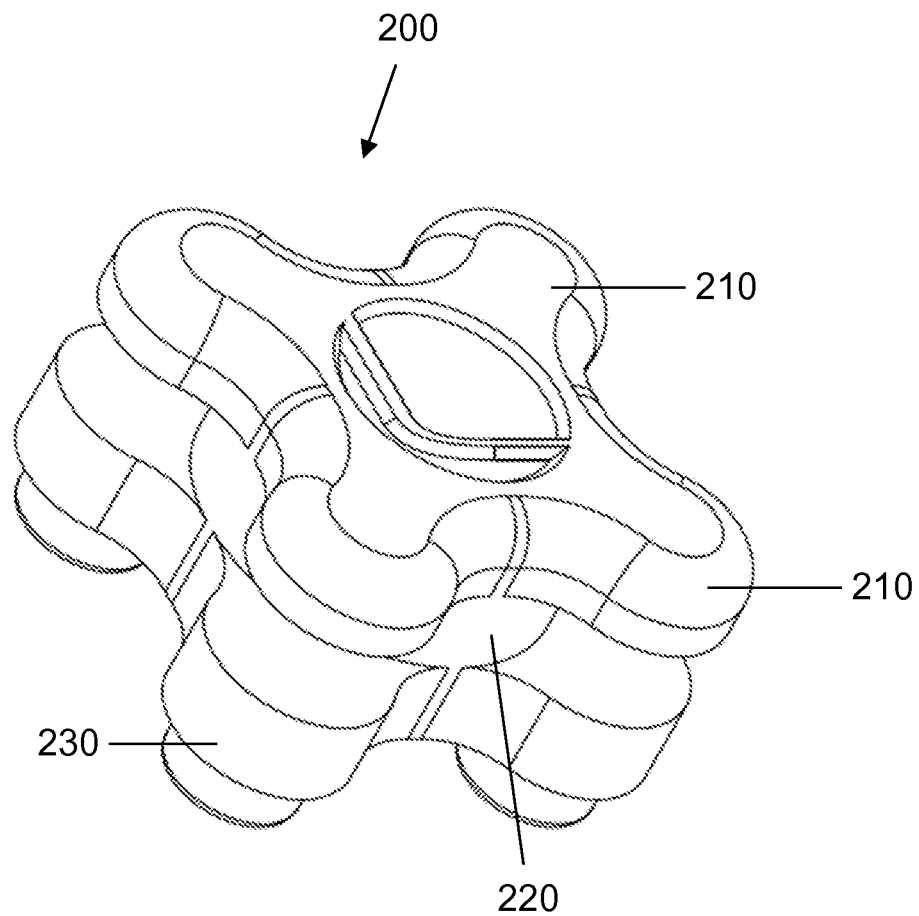
FIG. 8 shows one example of the accessory coupler lug.
Figure 9:
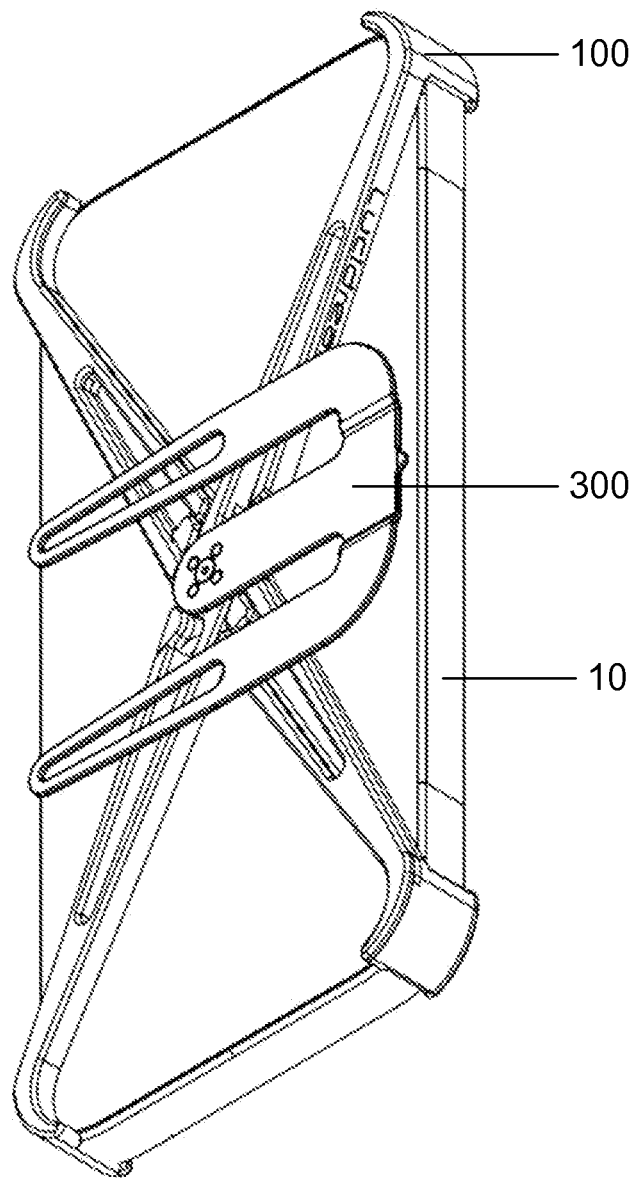
FIG. 9 shows an example of a belt mounting accessory.

Referring to FIG. 8, the preferred embodiment of the lug 200 is displayed. The lug 200 has a plurality of feet 210 on the outer end of the lug 200. The feet 210 can be arranged in any size and shape. In the preferred embodiment there are four feet 210 arranged in a cloverleaf orientation. Next to the feet 210 is a recess 220. Disposed on the opposite side of the lug 210 next to the recess 220 is the lug base 230. As shown in FIG. 9, the lug 200 permits the attachment of the casing 100 to a clip 300. The lug 200 may also be used to connect the casing 100 to an assortment of other accessory devices.

As shown in FIG. 10 the lug base 230 is attached to a clip. The feet 210 connect to the center of the casing 100. As shown in FIG. 11 and FIG. 12, the trigger arm 120 has a trigger arm shaped opening 126 disposed in the center of the trigger arm 120 and the main arm 130 has a main arm shaped opening 136 disposed in the middle of the main arm 130. The trigger arm shaped opening 126 and the main arm shaped opening 136 can be any size and shape but are complementary in shape to the lug feet 210. The trigger arm shaped opening 126 and the main arm shaped opening 136 each have a plurality of protrusions 150 extending inward. As shown in FIG. 10, the trigger arm shaped opening 126 and the main arm shaped opening 136 are put into alignment from an original unaligned position. The feet 210 are then inserted into the trigger arm shaped opening 126 and the main arm shaped opening 136. The protrusions 150 of the trigger arm shaped opening 126 and the main arm shaped opening 136 are positioned within the recess 220 of the lug. The trigger arm shaped opening 126 and the main arm shaped opening 136 are then returned to their original unaligned position to prevent the feet 210 from being removed from the casing 100.

Referring to FIG. 11 and FIG. 12, the separate sections of the casing 100 are illustrated. In addition to the portions described above, the base arm 110 has an internal edge 112. The trigger arm 120 is disposed against the internal edge 112 of the base arm 110 so that the internal edge 112 works as a stop against the trigger arm 120 and prevents further rotation of the trigger arm 120. In addition, the base arm 110 has a pair of keyholes 160 disposed in the central portion of the base arm 110 and the main arm 130 has a pair of retaining keys 162 disposed in the central portion of the main arm 130. The retaining keys 162 are inserted into the keyholes 160 to cause the main arm 130 to be removably secured to the base arm 110.

The casing 100 permits the protection of the phone 10 with a minimum of material. The casing 100 operates as a set of shock absorbers for the phone 10. If the phone is dropped the mechanical energy of the jarring caused by the sudden stop of the phone 10 against the ground is transferred from the phone to the casing 100. This mechanical energy causes the flexing of the trigger arm springs 124 and the main arm springs 134. In this manner the trigger arm springs 124 and the main arm springs 134 absorb the energy caused by the drop of the phone 10 and prevent damage to the phone 10.

What is claimed is:

1. A protective casing for a digital device comprising
   a) a base arm having a longitudinal body with a first end and a second end and comprising
      i) a plurality of main stops disposed in a center portion of said longitudinal body;
      ii) a plurality of trigger stops disposed in a center portion of said longitudinal body;
   b) a trigger arm disposed adjacent to said base arm having a longitudinal body with a first end, a second end, and a central portion and comprising
      i) a first trigger arm spring attached to said first end and extending toward said central portion with a trigger arm gap disposed between said first trigger arm spring and said trigger arm;
      ii) a second trigger arm spring attached to said second end and extending toward said central portion with a trigger arm gap disposed between said second trigger arm spring and said trigger arm;
   c) a main arm disposed adjacent to said trigger arm having a longitudinal body with a first end, a second end, and a central portion and comprising
      i) a first main arm spring attached to said first end and extending toward said central portion with a main arm gap disposed between said first main arm spring and said main arm;
      ii) a second main arm spring attached to said second end and extending toward said central portion with a main arm gap disposed between said second main arm spring and said main arm;
   d) wherein an outer edge of each of said main arm springs respectively contacts a main stop;
   e) wherein an inner edge of each of said trigger arm springs respectively contacts a trigger stop.

2. The protective case as in claim 1
   a) wherein said base arm further comprises
      i) a first corner portion disposed at said first end extending substantially perpendicular to said longitudinal body;
      ii) a second corner portion disposed at said second end extending substantially perpendicular to said longitudinal body;
   b) wherein said main arm further comprises
      i) a first corner portion disposed at said first end extending substantially perpendicular to said longitudinal body;
      ii) a second corner portion disposed at said second end extending substantially perpendicular to said longitudinal body.

3. The protective casing as in claim 2 further comprising
   a) a shaped opening having one or more inwardly facing protrusions disposed in said central portion of said main arm;
   b) a shaped opening having one or more inwardly facing protrusions disposed in said central portion of said trigger arm.

4. The protective casing as in claim 3 further comprising
   a) a lug having a plurality of feet and a recess disposed adjacent to said plurality of feet;
   b) wherein said one or more inwardly facing protrusions disposed in said central portion of said main arm and said one or more inwardly facing protrusions disposed in said central portion of said trigger arm are configured to fit within said recess of said lug when said lug is removably secured to said protective case.

5. The protective casing as in claim 1 further comprising
   a) a shaped opening having one or more inwardly facing protrusions disposed in said central portion of said main arm;
   b) a shaped opening having one or more inwardly facing protrusions disposed in said central portion of said trigger arm.

6. The protective casing as in claim 5 further comprising
   a) a lug having a plurality of feet and a recess disposed adjacent to said plurality of feet;
   b) wherein said one or more inwardly facing protrusions disposed in said central portion of said main arm and said one or more inwardly facing protrusions disposed in said central portion of said trigger arm are configured to fit within said recess of said lug when said lug is removably secured to said protective case.

7. The protective casing as in claim 1 further comprising
   a) a plurality of keyholes disposed in said base arm;
   b) a plurality of retaining keys disposed in said main arm;
   c) wherein each of said retaining keys are configured to respectively engage said keyholes to removably secure said main arm to said base arm.

8. The protective casing as in claim 7 further comprising
   a) a shaped opening having one or more inwardly facing protrusions disposed in said central portion of said main arm;

b) a shaped opening having one or more inwardly facing protrusions disposed in said central portion of said trigger arm.
9. The protective casing as in claim 8 further comprising
a) a lug having a plurality of feet and a recess disposed adjacent to said plurality of feet;
b) wherein said one or more inwardly facing protrusions disposed in said central portion of said main arm and said one or more inwardly facing protrusions disposed in said central portion of said trigger arm are configured to fit within said recess of said lug when said lug is removably secured to said protective case.
10. A protective case for a digital device comprising
a) a base arm having a longitudinal body with a first end, a second end;
   i) one or more main stops disposed in a center portion of said longitudinal body;
   ii) one or more trigger stops disposed in a center portion of said longitudinal body;
b) a trigger arm disposed adjacent to said base arm having a longitudinal body with a first end, a second end, a central portion, and one or more flexible trigger arm springs; and
c) a main arm disposed adjacent to said trigger arm having a longitudinal body with a first end, a second end, a central portion, and one or more flexible main arm springs.
11. The protective case as in claim 10
a) wherein said one or more flexible trigger arm springs contact said one or more trigger stops;
b) wherein said one or more flexible main arm springs contact said one or more main stops.
12. The protective casing as in claim 11 further comprising
a) a shaped opening having one or more inwardly facing protrusions disposed in said central portion of said main arm;
b) a shaped opening having one or more inwardly facing protrusions disposed in said central portion of said trigger arm.
13. The protective casing as in claim 12 further comprising
a) a lug having a plurality of feet and a recess disposed adjacent to said plurality of feet;
b) wherein said one or more inwardly facing protrusions disposed in said central portion of said main arm and said one or more inwardly facing protrusions disposed in said central portion of said trigger arm are configured to fit within said recess of said lug when said lug is removably secured to said protective case.
14. The protective casing as in claim 13 further comprising
a) a plurality of keyholes disposed in said base arm;
b) a plurality of retaining keys disposed in said main arm;
c) wherein each of said retaining keys are configured to respectively engage said keyholes to removably secure said main arm to said base arm.
15. The protective casing as in claim 11 further comprising
a) a plurality of keyholes disposed in said base arm;
b) a plurality of retaining keys disposed in said main arm;
c) wherein each of said retaining keys are configured to respectively engage said keyholes to removably secure said main arm to said base arm.
16. The protective casing as in claim 10 further comprising
a) a plurality of keyholes disposed in said base arm;
b) a plurality of retaining keys disposed in said main arm;
c) wherein each of said retaining keys are configured to respectively engage said keyholes to removably secure said main arm to said base arm.
17. The protective casing as in claim 10 further comprising
a) a shaped opening having one or more inwardly facing protrusions disposed in said central portion of said main arm;
b) a shaped opening having one or more inwardly facing protrusions disposed in said central portion of said trigger arm.
18. The protective casing as in claim 17 further comprising
a) a lug having a plurality of feet and a recess disposed adjacent to said plurality of feet;
b) wherein said one or more inwardly facing protrusions disposed in said central portion of said main arm and said one or more inwardly facing protrusions disposed in said central portion of said trigger arm are configured to fit within said recess of said lug when said lug is removably secured to said protective case.
19. A protective case for a digital device comprising
a) a base arm having a longitudinal body with a first end, a second end;
   i) one or more main stops disposed in a center portion of said longitudinal body;
   ii) one or more trigger stops disposed in a center portion of said longitudinal body;
b) a trigger arm disposed adjacent to said base arm having a longitudinal body with a first end, a second end, a central portion, and a means for rotationally flexing said trigger arm relative to said base arm;
c) a main arm disposed adjacent to said trigger arm having a longitudinal body with a first end, a second end, a central portion, and a means for rotationally flexing said main arm relative to said base arm.
20. The protective case as in claim 19 further comprising
a) a shaped opening having one or more inwardly facing protrusions disposed in said central portion of said main arm;
b) a shaped opening having one or more inwardly facing protrusions disposed in said central portion of said trigger arm
c) a lug having a plurality of feet and a recess disposed adjacent to said plurality of feet;
d) wherein said one or more inwardly facing protrusions disposed in said central portion of said main arm and said one or more inwardly facing protrusions disposed in said central portion of said trigger arm are configured to fit within said recess of said lug when said lug is removably secured to said protective case.

* * * * *